United States Patent [19]

Tolley et al.

[11] 4,380,094
[45] Apr. 19, 1983

[54] CRAB PROCESSING MACHINE

[75] Inventors: Calvert B. Tolley; Andrew T. Tolley, both of Wingate, Md.

[73] Assignee: Sea Savory Inc., Cambridge, Md.

[21] Appl. No.: 169,150

[22] Filed: Jul. 15, 1980

[51] Int. Cl.³ .............................................. A22C 29/02
[52] U.S. Cl. ...................................................... 17/71
[58] Field of Search ................... 17/71, 46, 55, 63, 24; 83/435.2; 198/654, 655

[56] References Cited

U.S. PATENT DOCUMENTS

| 3,288,271 | 11/1966 | Burford | 198/654 X |
| 3,495,293 | 2/1970 | Tolley | 17/71 |
| 3,596,310 | 8/1971 | Tolley | 17/71 X |
| 3,871,086 | 3/1975 | Rutledge | 17/48 X |
| 4,041,822 | 8/1977 | Gabel | 198/654 X |
| 4,073,041 | 2/1978 | Davis et al. | 17/71 |

Primary Examiner—Willie G. Abercrombie
Attorney, Agent, or Firm—Scrivener, Clarke, Scrivener & Johnson

[57] ABSTRACT

A machine for transporting cooked hard crabs to a plurality of successive stations at which the carapace pincers, walking legs, swimming legs and viscera are removed, and the remaining body is scrubbed and washed. An important feature is the provision of novel means for supporting each crab.

1 Claim, 20 Drawing Figures

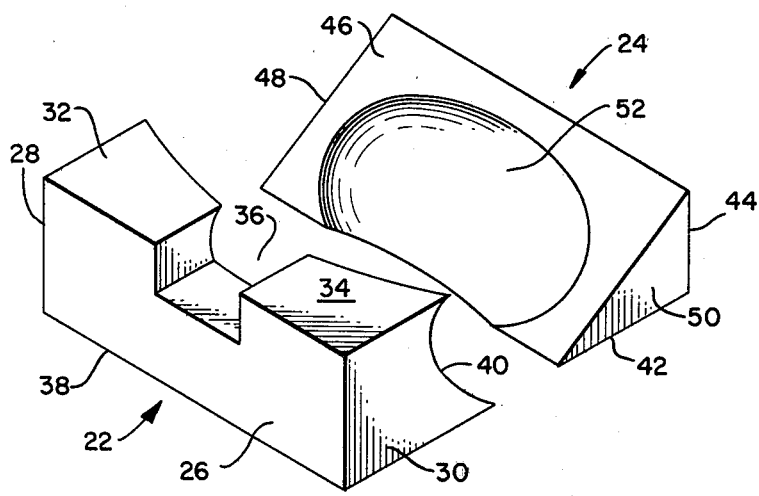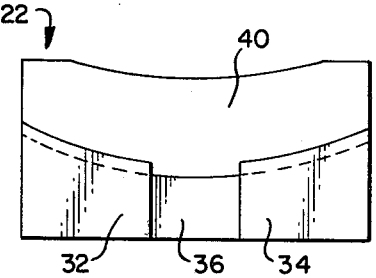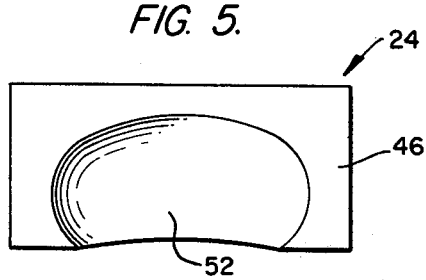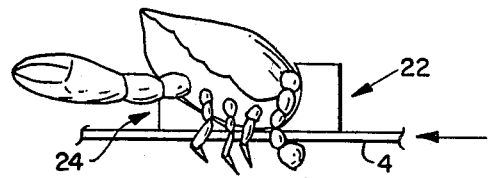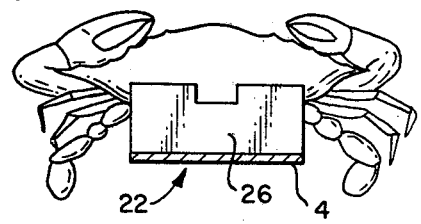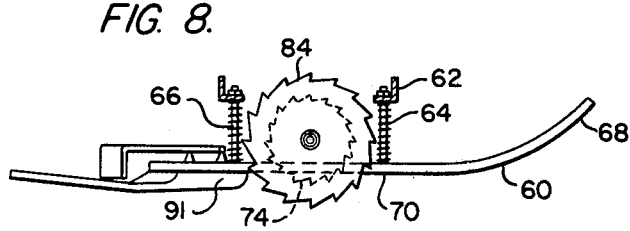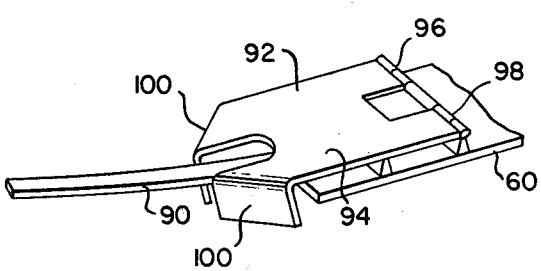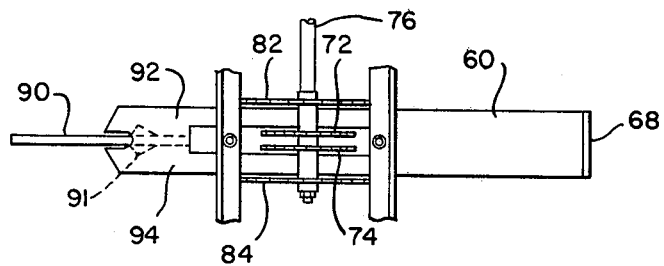

CRAB PROCESSING MACHINE

SUMMARY OF THE INVENTION

A machine for removing the carapace, legs, claws and flippers from cooked Chesapeake Bay hard crabs has endless belt means on which individual crabs are placed to be successively moved through a first work station at which the crab body is sawed to separate the carapace into lateral parts, the legs, claws and flippers are removed by sawing, and the carapace is removed, and then to a second work station at which the crab body is cleaned by scrubbing brushes and water sprays. A further feature of the invention is the provision of a two-part articulated holder for each crab.

DESCRIPTION OF THE DRAWINGS

FIG. 3 is a perspective view of the articulated crab holder forming part of the invention;

FIGS. 4 and 5 are, respectively, top plan views of the two parts of the crab holder;

FIG. 6 is a side view of the crab holder showing a crab positioned on its parts for processing by the machine;

FIG. 7 is an end view of the parts shown in FIG. 6;

FIGS. 8, 9 and 10 are, respectively, side, top and partial perspective views of the means provided at Station B of the machine for cutting and removing the carapace and the legs and claws;

DESCRIPTION OF THE INVENTION

The machine provided by the invention comprises means for individually moving cooked hard-shell Chesapeake Bay crabs to and through successive stations at which different operations are performed, resulting in the production of a crab body from which the carapace, claws, walking legs, swimming legs and viscera have been removed and which has been washed and scrubbed, leaving a body from which only the removal of the meat remains to be performed.

The basic parts of the machine are an elongated supporting frame, a plurality of work stations spaced along the length of the frame, an endless chain or belt continuously traveling throughout the length of the frame to successive work stations A to D, a plurality of articulated crab holders carried by and spaced along the length of the endless traveling means, and operating means at each work station to perform one or more operations on the crab supported on each holder.

Figure 1:
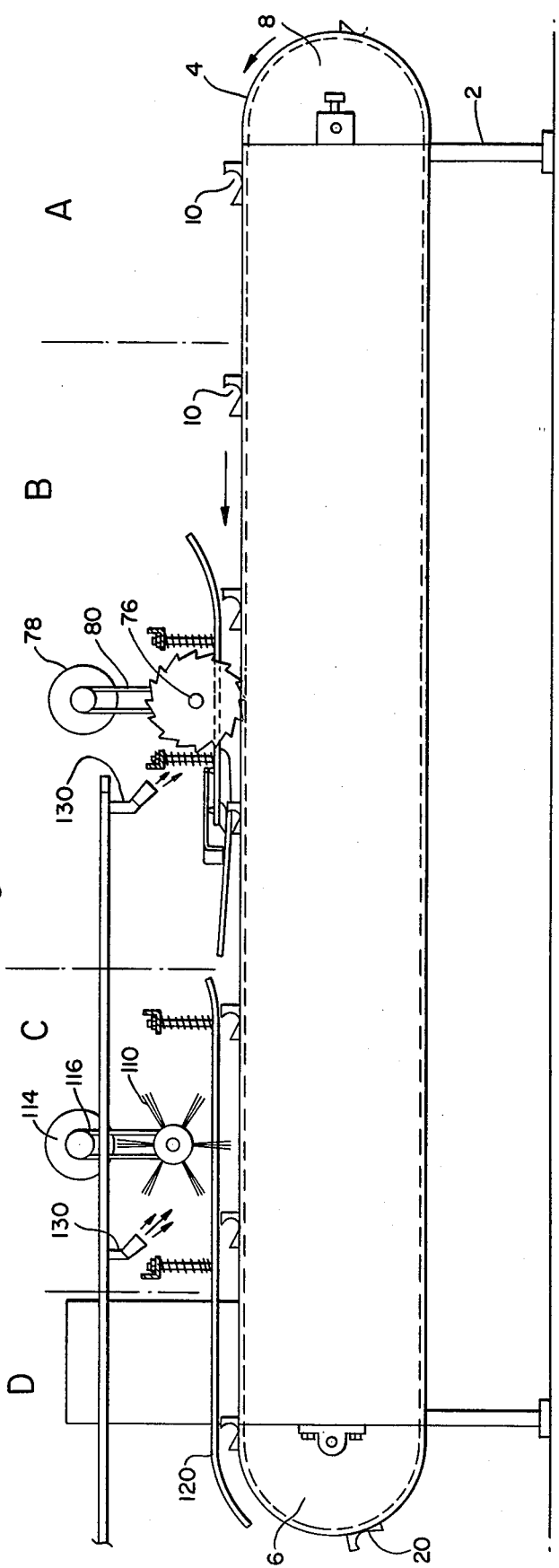
FIG. 1 is a side view of the crab processing machine provided by the invention.
Figure 2:
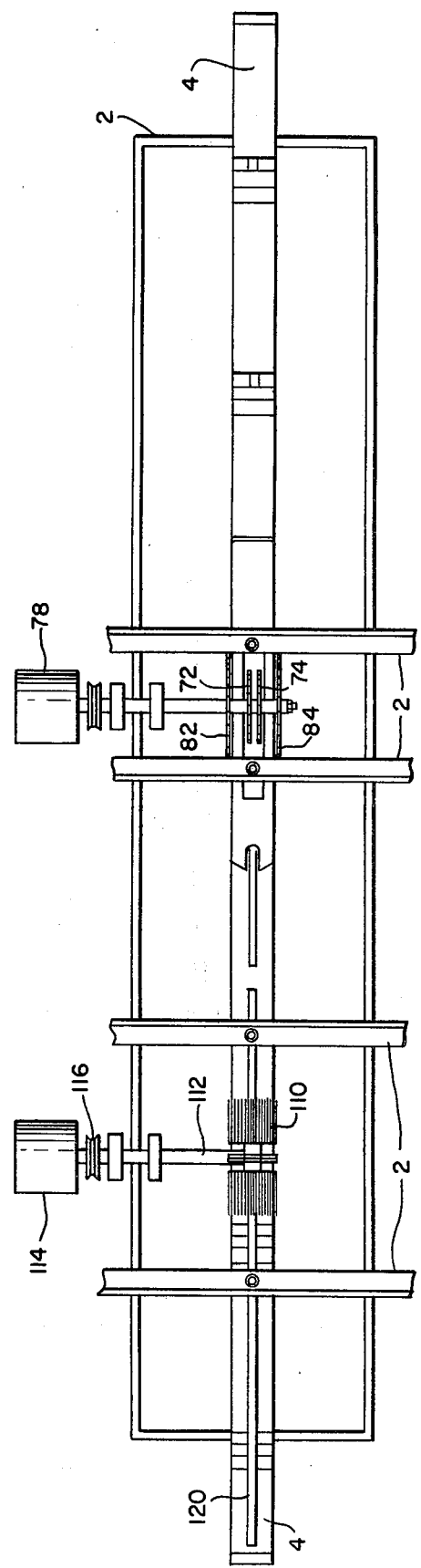
FIG. 2 is a top view of the machine.

The machine frame is shown generally at 2 in FIGS. 1 and 2 and may be of any size and configuration necessary to properly support the operating parts which form the invention.

The transport part of the machine comprises an endless belt or chain 4 which is trained over two spaced sprocket wheels 6, 8 which are supported at opposite ends of the machine frame and are driven by any suitable means. The upper reach of this belt passes from a loading station A at one end of the machine, through a plurality of work station B, C at which successive operations are performed, to a delivery station D at the other end of the machine from which the crab bodies pass for further processing by removal of the meat.

The loading station A is located adjacent and on the downstream side of the sprocket wheel at the loading end of the machine. Empty crab holders 10 carried by belt 4 arrive at this station and are filled, for example by workers, from trays on which cooked crabs are piled. Each holder carries one crab to the successive work stations, and each crab is mounted on a holder in the manner described herein in connection with the description of the holder itself.

From the loading station each holder with the complete, uncut crab carried thereby is moved first to a station B where saws cut the carapace in half and simultaneously the claws, walking legs and swimming legs are removed from each end of the crab by a second set of saws, after which the carapace is removed. The crab body is then carried by its holder to a station C at which it is subjected to rotary brush means and water sprays to clean it and remove any trash and debris. After processing at this station the parts of the articulated crab supporting holder pass about the sprocket wheel at the delivery end of the machine and are automatically separated to release the crab body, after which the parts of the holder return to closed position for the reception of a new crab body at the loading station.

The Articulated Crab Holder

A plurality of articulated crab holders 10 are mounted on the endless chain 4 and are suitably spaced along its length, each crab holder being constructed and intended to hold and support one crab throughout its passage through the successive work stations of the machine. Each crab holder comprises two separate parts 22, 24 which are separately connected to the chain 4 in downstream-upstream relation, part 22 being downstream from part 24 and separated from it. These parts are particularly illustrated in FIGS. 3, 4 and 5 and their co-operation in supporting a crab is illustrated in FIGS. 6 and 7.

Crab holder part 22 has a flat end wall 26 which faces downstream of the conveyor chain and extends laterally beyond the sides of the chain, end walls 28, 30, upper surfaces 32, 34 which are separated by a centrally located open ended cut-out part 36, bottom 38, and an upstream-facing end wall 40 which, transversely of the chain 4, is curved on the arc of a circle the center of which is upstream, and which is also concave between the upper surfaces 32, 34 and bottom 38. The crab holder part 24 is right-triangular in cross sectional shape, having bottom 42, end wall 44 at the upstream end of bottom 42, inclined surface 46 which faces downstream opposite the compound curved wall 40 of crab holder part 22, and side walls 48, 50. The surface 46 has formed in it a generally oval depression 52 which is centrally located in the surface. The positions, relations and sizes of the two crab holder parts, and the configurations of the surface 40 of part 22 and depression 52 of part 24, are such that they support a whole cooked Chesapeake Bay crab of legal size between them, as shown in FIGS. 6 and 7. In order to permit proper and intended operation of the machine apparatus at the successive work stations each crab is placed in the two-part holder with the carapace facing upwardly as shown in FIG. 6, and with the flippers, legs and claws outside the side walls 28, 30 and 48, 50 of the two parts of the holder as shown in FIG. 7. It will be understood that the parts of the crab holder will be made of such size that a legal size crab will be received and held in this relation of parts.

It will be understood by those skilled in the art that with appropriate adjustment for size of the parts of the holders, and any other necessary adjustments, the machine will process crabs other than Chesapeake Bay hard crabs such, for example, as tanner, jonah rock, stone, red, dunganess and other hard crabs.

Operations at Station B

Means are provided by the invention for holding each crab body firmly on its crab holder, cutting the carapace in half longitudinally of the body, cutting off the flippers, legs and claw at each side of the body of the crab, preliminarily cleaning the visceral cavity, and removing the two halves of the carapace. These means are provided at Station B as shown generally in FIGS. 1 and 2 and, more particularly, in FIGS. 8 to 15, and comprise, first, an elongated plate or sled 60 which is positioned above and parallel to the belt 4 and is supported on the machine frame at 62 by bolts 64 each of which is surrounded by a compression spring 66 which bears downwardly on the sled 60. At its upstream end the sled is upwardly curved as shown at 68 in order to freely admit and accommodate the crab body entering Station B on a crab holder. Downstream of the upwardly curved entering part 68 the sled is provided with a level part 70 which is positioned vertically above the upper surface of the belt by such a distance that the sled is forced downwardly on the crab body by springs 66, thus maintaining the crab body in position on the holder while the operations at Station B are performed.

Between the ends of the sled 60 and between its side edges the machine is provided with two parallel vertical circular saws 72, 74 which are mounted on and rotated by a horizontal shaft 76 which, as shown in FIG. 2, is rotated by a motor 78 through belt connection 80. These two saws are positioned closely adjacent each other above the longitudinal center line of the belt 4, the sled 60 and the crab holder so that as the crab and its holder approach and pass the two saws the saws will cut the carapace longitudinally of the crab body, and in so doing the lower parts of the saws will extend into the visceral cavity, partially cleaning the same. It will be seen that the cut out part 36 of part 22 of the crab holder accommodates the rotating saws.

Figure 11:
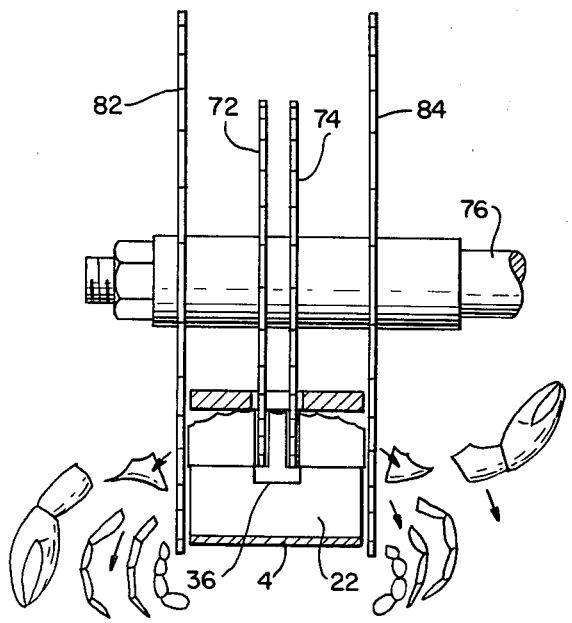
FIGS. 11 and 12 illustrate the operation of the saws at Station B.
Figure 12:
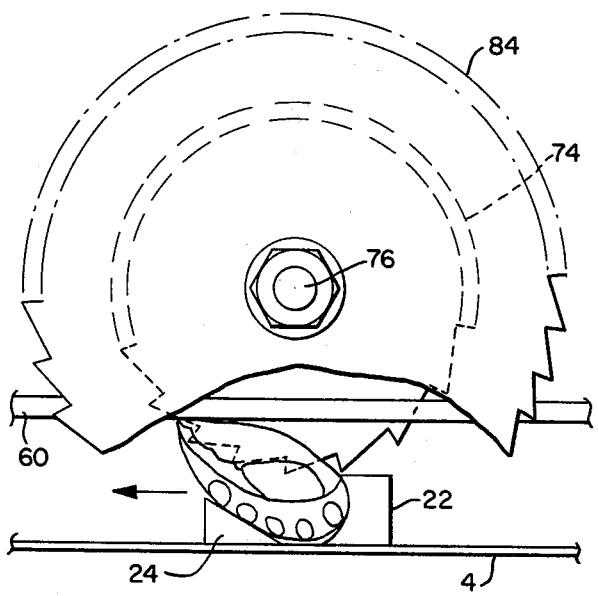
Figure 13:
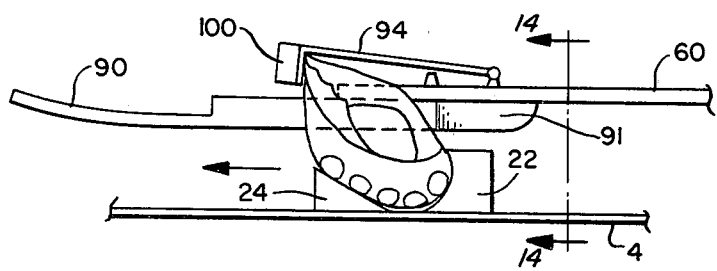
FIGS. 13, 14 and 15 are detailed views of the mans at Station B for removing the parts of the carapace after it is sawed.
Figure 14:
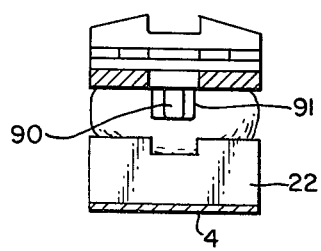
Figure 15:
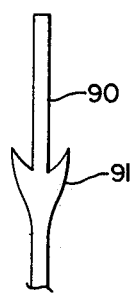

Also mounted on shaft 76 for rotation thereby are two additional circular saws 82, 84 which are positioned externally of the side edges of the endless belt and are so positioned that they will cut off the legs, flippers and claw at each side of the crab body, as shown in FIGS. 11 and 12.

After the crab passes from the saws 72, 74, 82, 84 it is held on the crab holder by downward pressure maintained on the crab body by a vertically floating hold down rod 90 which extends from the lower surface of sled 60 in the direction of belt movement and which is positioned to extend through the central saw cut in the carapace into the visceral cavity. The floating rod is provided adjacent, but spaced from, its free downstream end with a part 91 known as the plow, which comprises two prongs which respectively extend outwardly from the side edges of the floating rod in the downstream direction and which have the functions of forcing the undesired visceral material from the central cavity of the crab body and loosening the carapace. The means provided at Station B for removing the carapace are located downstream from the four saws and comprise two elongated arms 92, 94 which are arranged in side-by-side relation above belt 4 and which extend in the direction of belt travel from pivotal supports 96, 98 on the downstream end of sled 60 so that they have floating vertical movement. At its downstream end each of these arms is turned downwardly and rearwardly to provide a hook 100. It will be apparent that as each crab holder moves from beneath sled 60 the edges of the two halves of the cut carapace will engage the hooks and on further movement of the holder the two halves will be torn off and removed from the body, and then discharged from the machine by gravity. As the hook members float vertically on their pivotal supports they adjust automatically to the height of the crab body and therefore always grasp the leading edge of the carapace of each crab.

Operation at Station C

Figure 16:
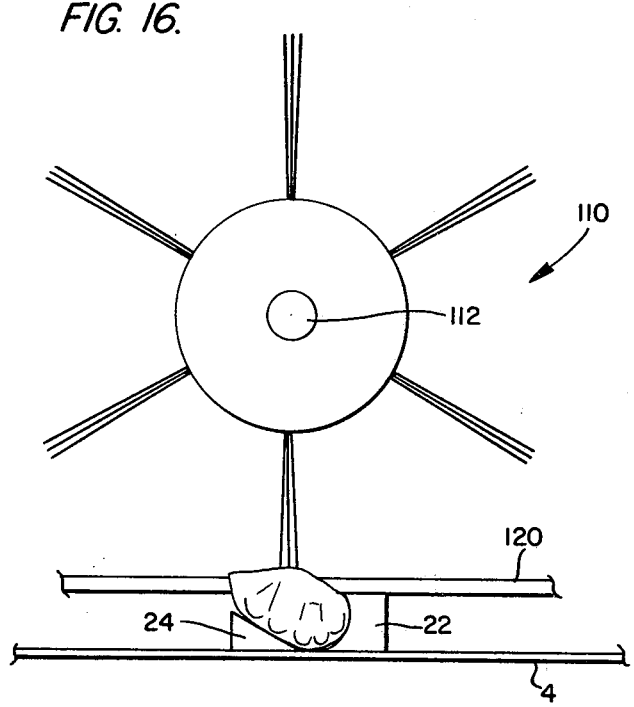
FIG. 16 is an enlarged side view of the means provided at Station C for cleaning the crab body.
Figure 17:
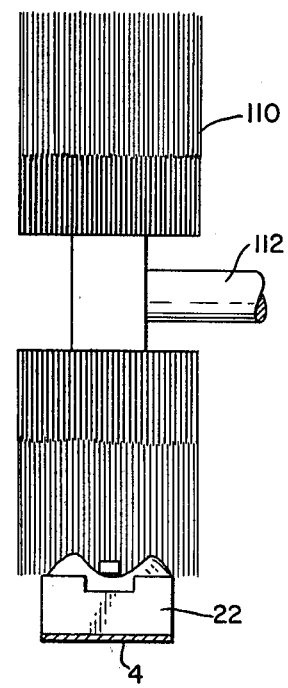
FIG. 17 is a top plan view of the brush at Station C.
Figure 19:
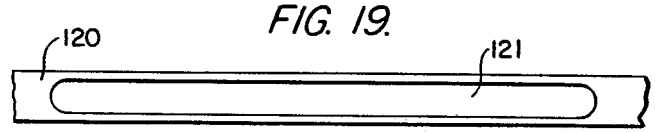
FIG. 19 is an elevational view of a part at Station C.
Figure 18:
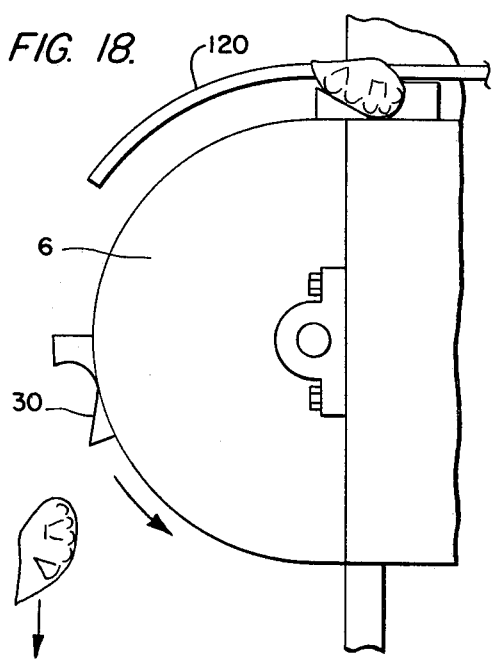
FIG. 18 illustrates the action of the articulated crab holder at the discharge end of the machine.
Figure 20:
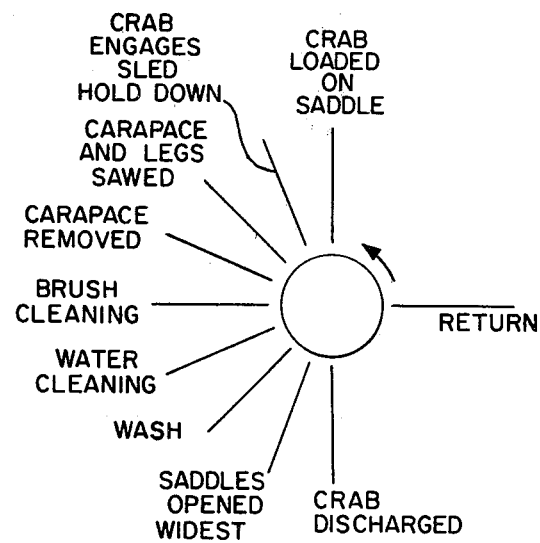
FIG. 20 is a schematic figure showing the sequence of operations of the machine.

The apparatus at this station is disclosed generally in FIGS. 1 and 2 and, more particularly, in FIGS. 16, 17 and 18 and comprise a rotary brush 110 which is mounted on shaft 112 which extends transversely of the machine and is rotated by electric motor 114 through any suitable means such as belt 116. This brush is positioned centrally of the belt 4 and at such a height that it will enter into the visceral cavity of the crab body held on a holder and remove viscera and trash therefrom, and will also preferably be sufficiently wide that it will scrub the side and other parts of the crab body.

Each crab body is held firmly on its holder during the brushing and cleaning operation by the downward pressure of a hold down bar or sled 120 which extends in the direction of belt movement. This bar is positioned centrally of the belt and is so positioned above the belt and the crab holders that it enters the visceral cavity of each crab body and is of such length that it engages the crab body until it is finally discharged from the machine, as shown in FIG. 1.

Streams and sprays of water are directed toward the various stations of the machine from the pipes 130 and serve to flush waste matter downwardly to be removed as trash. In a preferred form, the hold down bar is provided with an elongated opening 121 through which water is sprayed into the visceral cavity.

Discharge Station D

As described above each crab holder 20 comprises two parts 22, 24 which are spaced longitudinally of the belt 4 and are of such size, configuration and relation to snugly hold a crab, and the crab body after passage from Station C. Because of this crab holder structure and relation to the endless belt 4 the two parts of each crab holder will separate as the holder passes over the sprocket wheel 6 at the discharge end of the machine, this separation being illustrated in FIGS. 1 and 18, thus automatically discharging the crab body from the machine.

We claim:

1. A machine for processing whole, cooked, hard crabs, comprising an elongated supporting frame, a plurality of work stations spaced along the length of the machine, an endless belt supported on vertical rotating support and driving wheels at the loading and delivery ends of the frame and having elongated section thereof extending adjacent the work stations, a plurality of crab holders mounted on said belt and spaced along the length thereof, means at each work station for performing an operation on the crab carried by each holder, each of said crab holders comprising two parts the configurations of which are such that they cooperate to snugly support and hold a crab, the parts being separately connected to the belt and spaced apart in the direction of movement of the belt whereby the parts separate to discharge the crab body therefrom as the holder passes about the belt support and driving wheel at the discharge end of the machine, the means at the first work station reached by each crab holder comprising means for holding the crab body in position on its holder and sawing through the carapace and the ends of the crab body longitudinally of the crab body and then cleaning the visceral cavity, the means at the second work station reached by each crab holder comprising means for holding the crab body in position on its holder and cleaning and water spraying the crab body including the visceral cavity, said holding means comprising an elongated rod having an elongated opening therethrough through which water spray passes to the visceral cavity.

* * * * *